US012701036B2

(12) United States Patent
Lin et al.

(10) Patent No.: US 12,701,036 B2
(45) Date of Patent: Aug. 4, 2026

(54) METHOD AND APPARATUS FOR TRANSMITTING AND RECEIVING A SIGNAL

(71) Applicant: Samsung Electronics Co., Ltd., Suwon-si (KR)

(72) Inventors: Peng Lin, Beijing (CN); Di Su, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

(21) Appl. No.: 18/391,376

(22) Filed: Dec. 20, 2023

(65) Prior Publication Data

US 2024/0205061 A1    Jun. 20, 2024

(30) Foreign Application Priority Data

Dec. 20, 2022    (CN) .......................... 202211643208.6

(51) Int. Cl.
*H04L 27/26*      (2006.01)
*H04W 72/0446*    (2023.01)
*H04W 72/0453*    (2023.01)
*H04W 72/1263*    (2023.01)
*H04L 5/00*       (2006.01)

(52) U.S. Cl.
CPC ...... *H04L 27/2605* (2013.01); *H04L 27/2628* (2013.01); *H04W 72/0446* (2013.01);
(Continued)

(58) Field of Classification Search
None
See application file for complete search history.

(56) References Cited

U.S. PATENT DOCUMENTS 8,576,932 B2     11/2013  Larsson et al.
2017/0195155 A1*  7/2017  Zhang ................. H04L 27/2627
(Continued)

FOREIGN PATENT DOCUMENTS

EP          3962007 A1     3/2022
WO       2022087569 A1     4/2022
(Continued)

OTHER PUBLICATIONS

International Search Report and Written Opinion of the International Searching Authority dated Mar. 25, 2024, in connection with International Application No. PCT/KR2022/021145, 6 pages.
(Continued)

*Primary Examiner* — Minh Trang T Nguyen

(57) ABSTRACT

The disclosure relates to a 5G or 6G communication system for supporting a higher data transmission rate. The disclosure provides a method performed by a first node in a wireless communication system, the method comprising: generating a first physical signal and a second physical signal; and generating a first baseband signal on a first time unit based on the first physical signal and a second baseband signal on a second time unit based on the second physical signal, wherein the first baseband signal comprises a first part in which the first physical signal is leftwaard cyclic shifted by a length of a first cyclic prefix and the first cyclic prefix which is appended to a head of the first part, wherein the second baseband signal comprises a second part and a second cyclic prefix which is appended to a head of the second part, and wherein a third part comprising a part of the first part of the first baseband signal and the second cyclic prefix of the second baseband signal is configured as a cyclic prefix for the second part of the second baseband signal which is used for joint communication and sensing (JCAS).

16 Claims, 15 Drawing Sheets

| First baseband signal | | Second baseband signal | |
|---|---|---|---|
| First cyclic prefix | First part in the first baseband signal except the first cyclic prefix | second cyclic prefix | second part in the second baseband signal except the second cyclic prefix |

Exactly same as the second part

Two OFDM symbols

(52) U.S. Cl.
    CPC ... *H04W 72/0453* (2013.01); *H04W 72/1263*
                 (2013.01); *H04L 5/0007* (2013.01)

(56)                    References Cited

U.S. PATENT DOCUMENTS

2019/0312764 A1    10/2019  Xin
2022/0022263 A1*    1/2022  Zhang ................. H04W 74/006

FOREIGN PATENT DOCUMENTS

WO          2022169266 A1     8/2022
WO          2022248011 A1    12/2022

OTHER PUBLICATIONS

Hofstadler, et al., "Joint Communication and Sensing: 5G NR Compliant Ranging Using the Sounding Reference Signal," arXiv:2209.06566v2 [eess.SP], Sep. 2022, 5 pages.
Wei, et al., "5G PRS-Based Sensing: A Sensing Reference Signal Approach for Joint Sensing and Communication System," arXiv:2211.11488v1 [eess.SP], Nov. 2022, 23 pages.
Zhang, et al., "OFDM Synthetic Aperture Radar Imaging with Sufficient Cyclic Prefix," arXiv:1306.3604v2 [cs.IT], May 2014, 26 pages.
Supplementary European Search Report dated Feb. 18, 2026, in connection with European Patent Application No. 23907750.6, 8 pages.

* cited by examiner

116

305

310
RF TRANSCEIVER

325
RX PROCESSING CIRCUITRY

330
SPEAKER

320
MICROPHONE

315
TX PROCESSING CIRCUITRY

345
I/O IF

340
PROCESSOR/CONTROLLER

350
INPUT DEVICE(S)

355
DISPLAY

360
STORAGE

361
OPERATING SYSTEM

362
APPLICATIONS

Subcarrier1
Subcarrier0

Subcarrier mapped to port 3/7

Subcarrier mapped to port 2/6

Subcarrier mapped to port 1/5

Subcarrier mapped to port 0/4

$$\alpha_0 = \alpha_1 = \alpha_2 = \alpha_3 = 0$$
$$\alpha_4 = \alpha_5 = \alpha_6 = \alpha_7 = \frac{1}{2}$$

METHOD AND APPARATUS FOR TRANSMITTING AND RECEIVING A SIGNAL

CROSS-REFERENCE TO RELATED APPLICATION

This application is based on and claims priority under 35 U.S.C. § 119 to China Patent Application No. 202211643208.6 filed on Dec. 20, 2022, in the Chinese Intellectual Property Office, the disclosure of which is incorporated by reference herein in its entirety.

BACKGROUND

1. Field

The present application relates to a technical field of wireless communication, and more specifically, relates to a method and a device for transmitting and receiving a signal in a wireless communication network.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems."

5G communication systems are implemented in higher frequency (mmWave) bands, e.g., 60 GHz bands to achieve a higher data rate. In order to reduce propagation loss of radio waves and increase transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

6G system can be implemented in a higher frequency band compared with 5G system to achieve a higher data rate.

SUMMARY

A method performed by a first node in a wireless communication system, the method comprising: generating a first physical signal and a second physical signal; and generating a first baseband signal on a first time unit based on the first physical signal and a second baseband signal on a second time unit based on the second physical signal, wherein the first baseband signal comprises a first part in which the first physical signal is leftwaard cyclic shifted by a length of a first cyclic prefix and the first cyclic prefix which is appended to a head of the first part, wherein the second baseband signal comprises a second part and a second cyclic prefix which is appended to a head of the second part, and wherein a third part comprising a part of the first part of the first baseband signal and the second cyclic prefix of the second baseband signal is configured as a cyclic prefix for the second part of the second baseband signal which is used for joint communication and sensing (JCAS).

A first node in a wireless communication system, the first node comprising: a transceiver; and a controller coupled with the transceiver and configured to: generating a first physical signal and a second physical signal, generating a first baseband signal on a first time unit based on the first physical signal and a second baseband signal on a second time unit based on the second physical signal, wherein the first baseband signal comprises a first part in which the first physical signal is leftwaard cyclic shifted by a length of a first cyclic prefix and the first cyclic prefix which is appended to a head of the first part, wherein the second baseband signal comprises a second part and a second cyclic prefix which is appended to a head of the second part, and wherein a third part comprising a part of the first part of the first baseband signal and the second cyclic prefix of the second baseband signal is configured as a cyclic prefix for the second part of the second baseband signal which is used for joint communication and sensing (JCAS).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
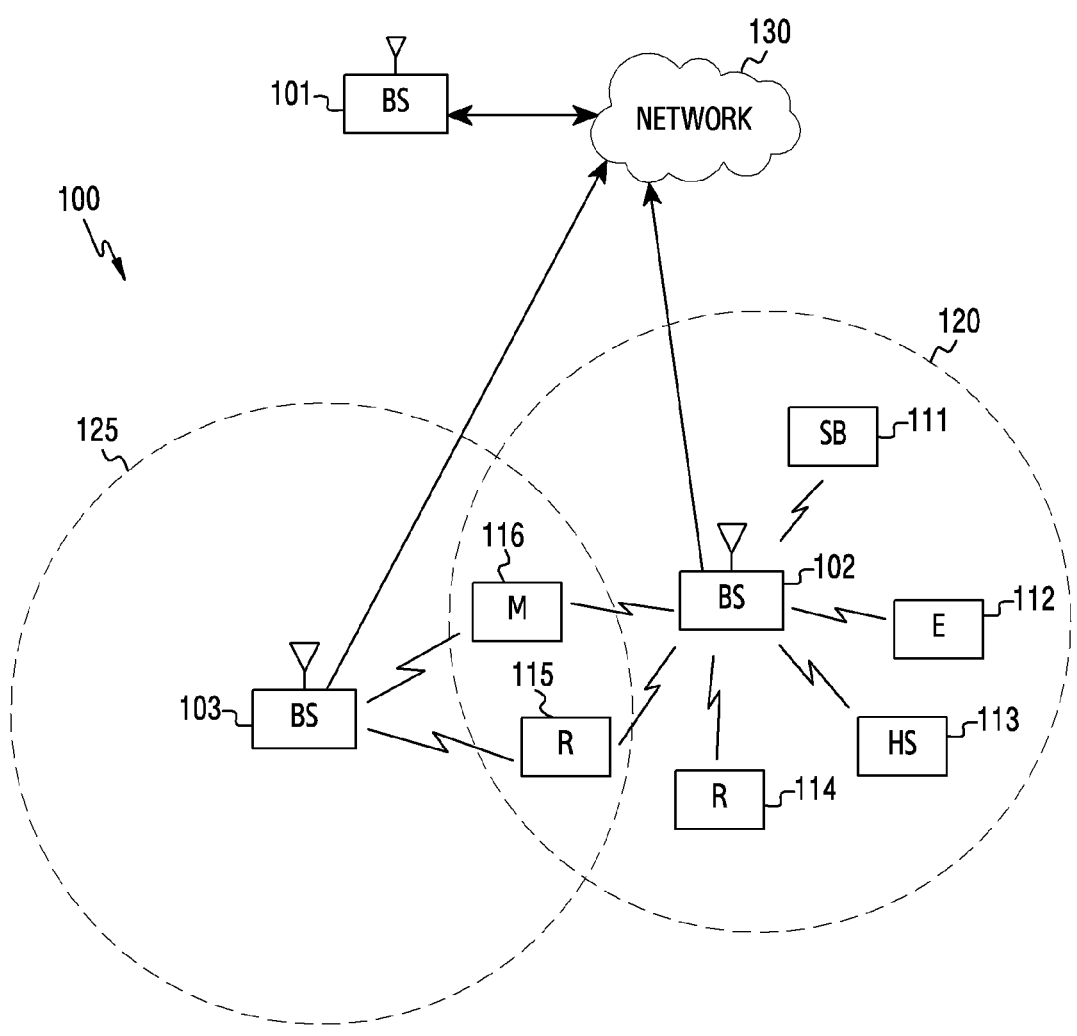
FIG. 1 illustrates an example of a wireless network according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to an aspect of the disclosure, a method performed by a first node in a wireless communication system is provided, the method comprising: generating a physical signal; generating a first baseband signal on a first time unit and a second baseband signal on a second time unit based on the physical signal.

Optionally, wherein the first baseband signal comprises a first cyclic prefix and a first part except the first cyclic prefix; the second baseband signal comprises a second cyclic prefix and a second part except the second cyclic prefix; the first part is the same as the second part after being cyclic shifted to the left by the number of the length of the first cyclic prefix.

Optionally, wherein performing a first inverse Fourier transform on the physical signal to obtain the first baseband signal; performing a second inverse Fourier transform on the physical signal to obtain the second baseband signal.

Optionally, wherein generating a physical signal comprises: mapping a sequence to time-frequency domain resources to obtain the physical signal; wherein mapping a sequence to time-frequency domain resources comprises: mapping the sequence based on different subcarriers and/or different cyclic shifts.

Optionally, the subcarrier is determined based on an offset, and the offset is a value from 0 to the number of ports −1.

Optionally, the physical signal corresponds to at least one port, and the physical signal corresponding to each of multiple ports is mapped to different subcarriers or to the same subcarrier with different cyclic shifts. According to another aspect of the disclosure, a method performed by a first node UE in a wireless communication system is provided, the method comprising: generate a physical signal; generating a first baseband signal on a first time unit based on the physical signal; the first baseband signal comprises a first cyclic prefix and a first part and a second part except the first cyclic prefix; and the first part and the second part are the same.

Optionally, generating a physical signal comprises mapping a sequence to subcarriers based on different cyclic shifts to obtain the physical signal.

Optionally, mapping a sequence to subcarriers comprises mapping the sequence to subcarriers with even numbers, wherein the numbers start from 0.

Optionally, the physical signal corresponds to at least one port, and the physical signal corresponding to each of multiple ports is mapped to the same subcarriers and has different cyclic shifts.

According to yet another aspect of the disclosure, a method performed by a first node in a wireless communication system is provided, the method comprising: receiving, within a reception window, a part of a baseband signal except a first cyclic prefix; the baseband signal comprises a first baseband signal on a first time unit and a second baseband signal on a second time unit, wherein: the first baseband signal comprises a first cyclic prefix and a first part except the first cyclic prefix; the second baseband signal comprises a second cyclic prefix and a second part except the second cyclic prefix; the first part is the same as the second part after being cyclic shifted to the left by the number of the length of the first cyclic prefix; and performing channel estimation based on the received baseband signal except the first cyclic prefix.

Optionally, a sensing result within a first distance range is determined based on the channel estimation of the first part and the second part; or a sensing result within a second distance range is determined based on the channel estimation of the second part, the second distance range is greater than the first distance range.

Optionally, data or signals from other devices are not received on the same time-frequency domain resources as those for the baseband signal.

Optionally, the reception window is opened at the same time as the transmission of the first cyclic prefix is ended, and the reception window is closed at the same time as the transmission of the second part is ended.

According to another aspect of the disclosure, a method performed by a first node in a wireless communication system is provided, the method comprising: receiving, within a reception window, a part of a baseband signal except a first cyclic prefix; the baseband signal is a first baseband signal on a first time unit, wherein: the first baseband signal comprises the first cyclic prefix and a first part and a second part except the first cyclic prefix; the first part and the second part are the same; and performing channel estimation based on the received baseband signal except the first cyclic prefix.

Optionally, a sensing result within a first distance range is determined based on the channel estimation of the first part and the second part; or a sensing result within a second distance range is determined based on the channel estimation of the second part, wherein the second distance range is greater than the first distance range.

Optionally, data or signals from other devices are not received on the same time-frequency domain resources as those for the baseband signal.

Optionally, the reception window is opened at the same time as the transmission of the first cyclic prefix is ended, and the reception window is closed at the same time as the transmission of the second part is ended.

According to yet another aspect of the disclosure, a first node in a wireless communication system is provided, the first node including a transceiver configured to transmit and receive a signal with the outside; and a controller configured to perform the methods described according to embodiments of the disclosure.

Advantageous Effects

The disclosure achieves sensing of an ultra-long-distance object by designing a method and a device for transmitting a physical signal in a wireless communication system.

The following description with reference to the drawings is provided to facilitate a comprehensive understanding of various embodiments of the disclosure defined by the claims and their equivalents. This description includes various specific details to facilitate understanding but should only be considered as exemplary. Therefore, those skilled in the art will recognize that various changes and modifications can be made to various embodiments described herein without departing from the scope and spirit of the disclosure. In addition, for the sake of clarity and conciseness, descriptions of well-known functions and structures may be omitted.

The terms and expressions used in the following specification and claims are not limited to their dictionary meanings, but are only used by the inventors to enable a clear and consistent understanding of the disclosure. Therefore, it should be obvious to those skilled in the art that the following descriptions of various embodiments of the disclosure are provided for illustration purposes only and are not intended to limit the purposes of the disclosure as defined in the appended claims and their equivalents.

It should be understood that singular forms of "a," "an" and "the" include plural referents unless the context clearly indicates otherwise. Thus, for example, a reference to a "component surface" includes a reference to one or more such surfaces.

The terms "include" or "may include" refer to the existence of corresponding disclosed functions, operations or components that may be used in various embodiments of the disclosure, without limiting the existence of one or more additional functions, operations or features. In addition, the terms "include" or "have" can be interpreted as indicating certain characteristics, numbers, steps, operations, constituent elements, components or combinations thereof, but should not be interpreted as excluding the possibility of the existence of one or more other characteristics, numbers, steps, operations, constituent elements, components or combinations thereof.

The term "or" used in various embodiments of the disclosure includes any of the listed terms and all combinations thereof. For example, "A or B" may include A, may include B, or may include both A and B.

Unless defined differently, all terms (including technical terms or scientific terms) used in this disclosure have the same meaning understood by those understood by those skilled in the art as described in this disclosure. General terms, as defined in dictionaries, are interpreted as having meanings consistent with the context in the relevant technical fields, and should not be interpreted in an idealized or overly formal way unless explicitly defined in this disclosure.

FIG. 1 illustrates an example wireless network 100 according to various embodiments of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of the gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of a gNB 101, a gNB 102, and a gNB 103 include a 2D antenna array as described in embodiments of the disclosure. In some embodiments, one or more of the gNB 101, the gNB 102, and the gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
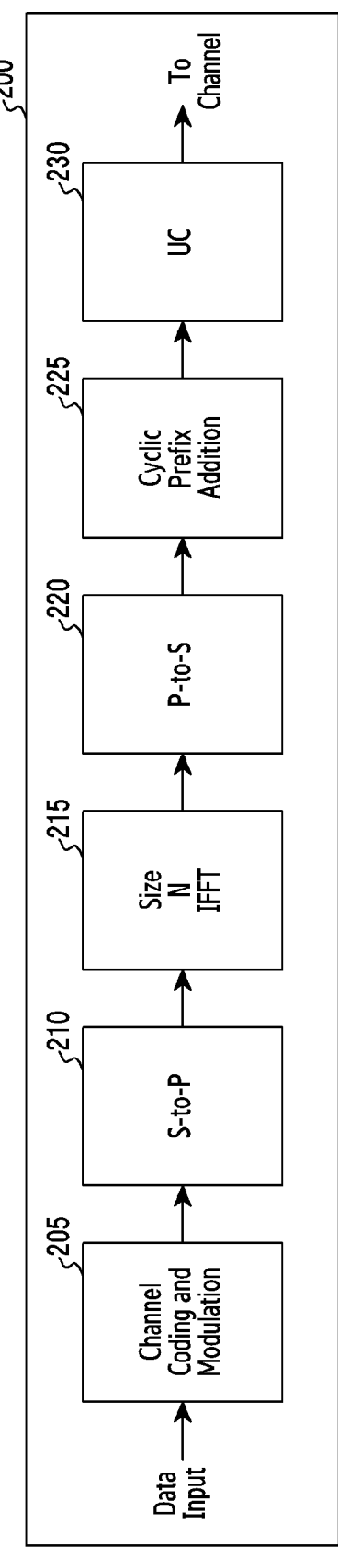
FIGS. 2a and 2b illustrate examples of wireless transmission and reception paths according to embodiments of the present disclosure.
Figure 2B:
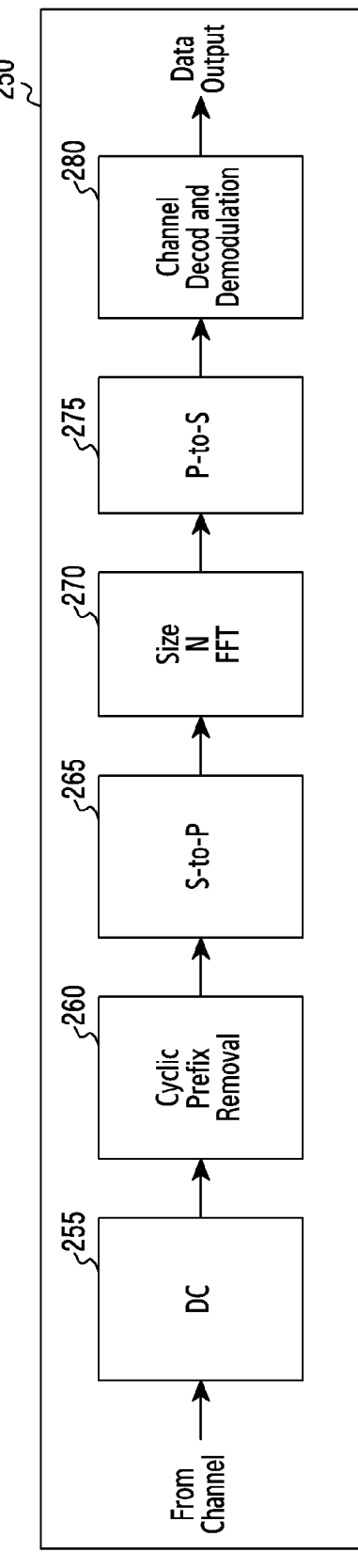

FIGS. 2a and 2b illustrate examples of wireless transmission and reception paths according to the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in a gNB 102 and a UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at a UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
FIG. 3a illustrates an example of a UE according to embodiments of the present disclosure.

FIG. 3a illustrates an example of a UE 116 according to various embodiments of the present disclosure. The embodiment of UE 116 shown in FIG. 3a is for illustration only, and UEs 111-115 of FIG. 1 can have the same or similar configuration. However, a UE has various configurations, and FIG. 3a does not limit the scope of the disclosure to any specific implementation of the UE.

A UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactivated video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and perform an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to perform the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers.

I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. Apart of the memory 360 can include a random access memory (RAM), while another part of the memory 360 can include a flash memory or other read-only memory (ROM).

Although FIG. 3a illustrates an example of UE 116, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 116 is configured as a mobile phone or a smart phone, UEs can be configured to operate as other types of mobile or fixed devices.

Figure 3B:
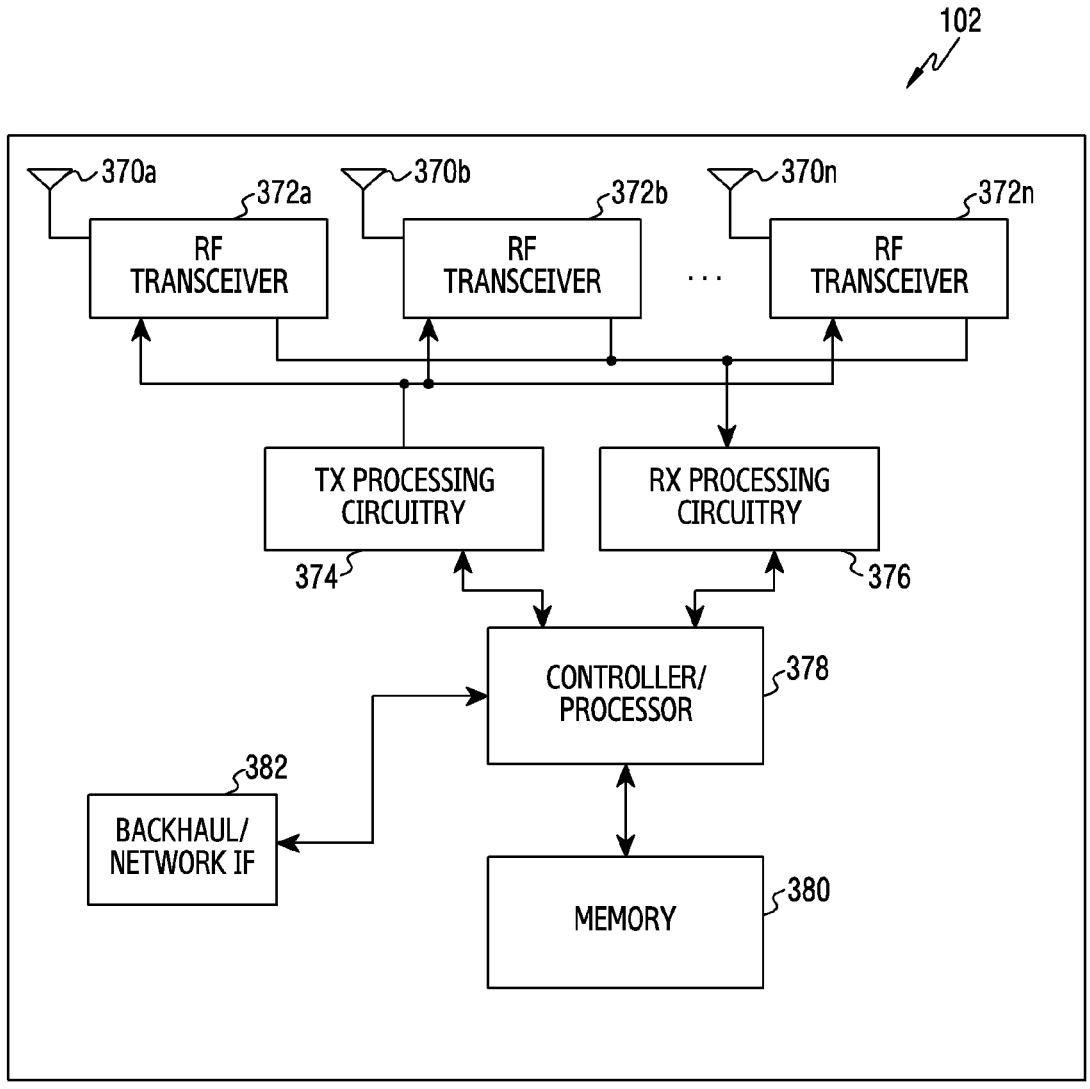
FIG. 3b illustrates an example of a gNB according to embodiments of the present disclosure.

FIG. 3b illustrates an example of a gNB 102 according to various embodiments of the present disclosure. The embodiment of gNB 102 shown in FIG. 3b is for illustration only, and other gNBs of FIG. 1 can have the same or similar configuration. However, a gNB has various configurations, and FIG. 3b does not limit the scope of the disclosure to any specific implementation of a gNB. It should be noted that the gNB 101 and the gNB 103 can include the same or similar structures as the gNB 102.

As shown in FIG. 3b, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or base-band signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interacti-vated video game data) from the controller/processor 378. TX processing circuit 374 encodes, multiplexes and/or digi-tizes outgoing baseband data to generate a processed base-band or IF signal. RF transceivers 372a-372n receive the outgoing processed baseband or IF signal from TX process-ing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wire-less communication functions. For example, the controller/processor 378 can perform a blind interference sensing (BIS) process such as that performed through a BIS algo-rithm, and decode a received signal from which an interfer-ence signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodi-ments of the disclosure. In some embodiments, the control-ler/processor 378 supports communication between entities such as web RTCs. The controller/processor 378 can move data into or out of the memory 380 as required by an execution process.

The controller/processor 378 is also coupled to the back-haul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF trans-ceiver.

The memory 380 is coupled to the controller/processor 378. A part of the memory 380 can include an RAM, while another part of the memory 380 can include a flash memory or other ROMs. In certain embodiments, a plurality of indication, such as the BIS algorithm, are stored in the memory. The plurality of indications is configured to cause the controller/processor 378 to perform the BIS process and decode the received signal after subtracting at least one interference signal determined by the BIS algorithm.

As will be described in more detail below, the transmis-sion and reception paths of gNB 102 (implemented using RF transceivers 372a-372n, TX processing circuit 374 and/or RX processing circuit 376) support aggregated communica-tion with FDD cells and TDD cells.

Although FIG. 3b illustrates an example of a gNB 102, various changes may be made to FIG. 3b. For example, the gNB 102 can include any number of each component shown in FIG. 3a. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

Exemplary embodiments of the disclosure are further described below with reference to the accompanying drawings.

Text and drawings are provided as examples only to help readers understand the disclosure. They are not intended and should not be construed to limit the scope of the disclosure in any way. Although certain embodiments and examples have been provided, based on the disclosure herein, it is obvious to those skilled in the art that changes can be made to the illustrated embodiments and examples without departing from the scope of this disclosure.

How to improve spectrum utilization rate of a communication system has always been a hotspot issue for practitioners. In recent years, with the development of the operating frequency bands of communication systems towards high frequency, resource conflicts between communication systems and radar systems at high frequency band will occur inevitably. However, there are very high similarities between communication systems and radar systems in terms of background theoretical knowledge and hardware structure, so theoretically, two seemingly independent systems may be integrated to enhance functions of communication systems and improve spectrum efficiency, thereby achieving mutual benefit. Therefore, communication sensing integration is a hot research direction in the communication field, and it is also one of the candidate technologies of 6G. The core purpose of a communication sensing integration system is to use the same set of hardware devices to enable the sensing function of surrounding environment at the expense of as little resources as possible on the basis of ensuring the basic communication function. Contents of sensing includes distance, orientation, speed and even type of an object in the surrounding environment. Different from the technology of locating an access terminal in a traditional communication system, the communication sensing integration technology can further enable the sensing of various information of a non-access object, which greatly increases the ability of the communication system to dynamically adjust working state (scheduling, beam management, early warning of an access terminal, etc.) according to the surrounding environment.

Although waveform design is generally regarded as a key technology of communication sensing integration, theory demonstrates that OFDM waveform is the most suitable signal waveform for communication sensing integration. In addition, an operation way of a radar is to emit a narrow pulse signal with a large bandwidth into the environment, and then performs pulse compression on the received echo signal. A common way of pulse compression is matched filtering. Mathematically, this process is exactly the same as the channel estimation technology in a communication system. Therefore, it is the most reasonable and feasible option to develop environmental sensing function based on OFDM waveform.

As known, the communication system based on OFDM waveform also has the problem of coverage. In order to ensure the coverage is large enough and avoid inter-symbol interference, the OFDM communication system may add a cyclic prefix before the waveform after generating each time domain waveform. Generally, in order to keep resource overhead low, the ratio of cyclic prefix length to OFDM waveform length is usually small, but the corresponding coverage is not very large, which also limits the sensing range of the communication sensing integration system. On the other hand, for the communication sensing integration with OFDM waveform, in order to increase its sensing range (that is, to be able to perceive an object far outside the communication coverage), the required cyclic prefix may reach the level which seriously affects the data transmission rate of the communication system, so how to increase the sensing range without seriously affecting the transmission rate of the communication system may be the key of the communication sensing integration.

According to a physical signal of embodiments of the disclosure, the sensing of an ultra-long-distance object may be achieved at the expense of lower data transmission rate loss in a small coverage area. The meaning of the physical signal includes, but is not limited to, a dedicated physical signal used for communication sensing integration; a physical signal that may be used for communication sensing integration, such as a demodulation reference signal, including a demodulation reference signal of an uplink/downlink shared channel, a demodulation reference signal of an uplink/downlink control channel, a demodulation reference signal of a broadcast channel, etc.; a sounding reference signal (SRS); a channel state information reference signal (CSI-RS), etc. Preferably, the physical signal may be a demodulation reference signal. Further, the physical signal may be generated by a ZC sequence, or preferably, the physical signal may be generated by a pseudo-random sequence (for example, an m sequence or a gold sequence).

The cyclic prefix (CP) copies a piece of data at the end of a data symbol to the head of the symbol to form a cyclic structure, and the length of the cyclic prefix depends on the length of the waveform (the waveform length is uniquely determined by a subcarrier interval), wherein the ratio of the length of a normal cyclic prefix to the length of the waveform is about 1/14.

The method described in the disclosure may be performed by a first node in a wireless communication system, wherein the first node may include, but is not limited to, a UE, a BS, a relay node, an integrated access backhaul (IAB), etc.

Figure 4:
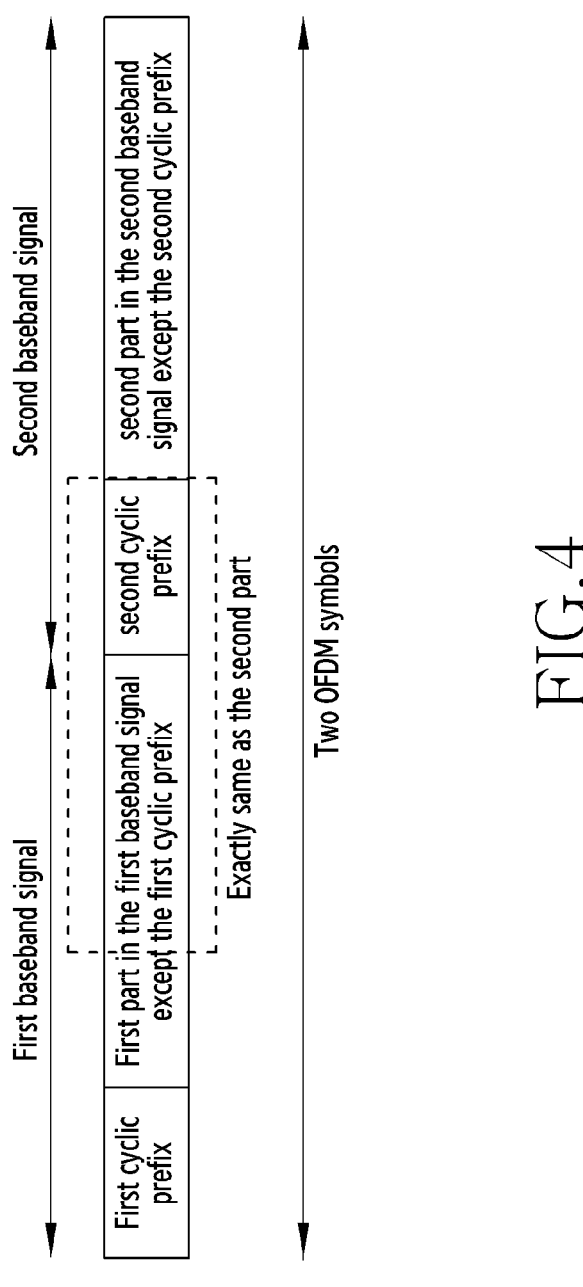
FIG. 4 illustrates an example of a structure of a time domain baseband signal generated by a physical signal when the physical signal is mapped on two OFDM symbols in time domain according to embodiments of the present disclosure.
Figure 5:
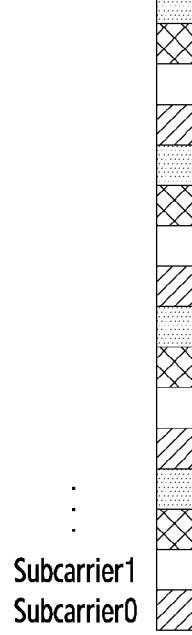
FIG. 5 illustrates an example of a frequency domain resource mapping of an 8-port physical signal when the physical signal is mapped on two OFDM symbols in time domain according to embodiments of the present disclosure.

Embodiment 1 according to the disclosure will be described below with reference to FIGS. 4-6. FIG. 4 illustrates an example of a structure of a time domain baseband signal generated by a physical signal when the physical signal is mapped on two OFDM symbols in time domain according to embodiments of the present disclosure.

As illustrated in FIG. 4, the physical signal is mapped on two OFDM symbols in time domain, and the time domain baseband signal generated by the physical signal consists of a first baseband signal and a second baseband signal, with the first baseband signal includes a first cyclic prefix and a first part except the first cyclic prefix, and the second baseband signal includes a second cyclic prefix and a second part except the second cyclic prefix. The first part is exactly the same as the second part after being cyclic shifted to the left by the number of a first cyclic prefix length, such that a third part in the first part except the leftmost first cyclic prefix being connected with the second cyclic prefix is exactly the same as the second part.

According to the structure of the time domain baseband signal generated by the physical signal as illustrated in FIG. 4, on the second one of the two OFDM symbols, although the coverage of the added second cyclic prefix itself is small, this cyclic prefix of normal length is continuous with the first part of the first one of the two OFDM symbols, so an equivalent cyclic prefix length of the second one of the two OFDM symbols becomes the length of the OFDM waveform, which can greatly increase the coverage of the second OFDM symbol.

Referring to FIG. 4, the physical signal according to embodiments of the disclosure and the time domain baseband signal generated by the physical signal may be generated by the following embodiments and examples.

In one embodiment of Step 1, the physical signal is generated.

The physical signal may be a multi-port signal, and physical signals of each port are orthogonal, which can be mapped to different subcarriers or to the same subcarrier but with different cyclic shifts. Specifically, assuming that the maximum number of ports supported by the system is $N_{port}$, the number of physical signal ports mapped to different subcarriers is $N_1$, and the number of physical signal ports mapped to the same subcarrier but with different cyclic shifts is $N_2$, then $N_1$ and $N_2$ satisfy $N_1 \times N_2 = N_{port}$. A sequence is used to perform resources mapping on the two OFDM symbols, producing a first physical signal for generating the first baseband signal and a second physical signal for generating the second baseband signal. With reference to FIG. 5, $N_{port}=8$ and $N_1=4$ is taken as an example, the method of generating the physical signal through the sequence will be described in detail. FIG. 5 illustrates an example of frequency domain resource mapping of an 8-port physical signal when the physical signal is mapped on two OFDM symbols in time domain according to embodiments of the present disclosure:

A first node device may assume that the sequence used to generate the physical signal is defined as r(n) and that r(n) is scaled by a factor $\beta$ to satisfy the transmission power requirements, and assumes that r(n) is mapped on resource element $(k, l)_p$ according to the following way:

$$a_{k,l}^{(p)} = \beta w_f(k')r(2n + k')$$

$$k = 8n + 4k' + \Delta$$

$$k' = 0,1$$

$$l = \bar{l}, \bar{l} + 1$$

$$n = 0, 1, \dots$$

wherein p represents the number of a port, $(k, l)_p$ represents the number of a resource element defined by the kth subcarrier and the lth OFDM symbol in the resource grid of port p, $w_f(k')$ and $\Delta$ is given by Table 1, $\bar{l}$ represents the number of the OFDM symbol where the first baseband signal is located and $\bar{l}+1$ represents the number of the OFDM symbol where the second baseband signal is located. The specific value of $\bar{l}$ may be a preset value, may be given by control information, and may also be given by MAC layer signaling or higher-layer signaling. And the following conditions are satisfied: (1) resource elements are in a resource block (RB) allocated to the transmission of the physical signal; (2) the reference point of k is the $0^{th}$ subcarrier of the RB with the smallest number within the system bandwidth; (3) the reference point of l is defined relative to the starting OFDM symbol of a time slot.

TABLE 1

Parameters of the Physical Signal

| Port p | $\Delta$ | $w_f(k')$ | |
| | | k' = 0 | k' = 1 |
| --- | --- | --- | --- |
| 0 | 0 | +1 | +1 |
| 1 | 1 | +1 | −1 |
| 2 | 2 | +1 | +1 |
| 3 | 3 | +1 | −1 |
| 4 | 0 | +1 | +1 |

TABLE 1-continued

Parameters of the Physical Signal

| Port p | $\Delta$ | $w_f(k')$ | |
| | | k' = 0 | k' = 1 |
| --- | --- | --- | --- |
| 5 | 1 | +1 | −1 |
| 6 | 2 | +1 | +1 |
| 7 | 3 | +1 | −1 |

In one embodiment of Step 2, the time domain baseband signal by the physical signal is generated.

A first inverse Fourier transform is performed on the first physical signal mapped on the first OFDM symbol to obtain the first baseband signal, and a second inverse Fourier transform is performed on the second physical signal mapped on the second OFDM symbol to obtain the second baseband signal. Wherein, the first inverse Fourier transform implements an $N_{FFT}$-point inverse Fourier transform of the physical signal on the first OFDM symbol and a right cyclic shift of the transformed time domain signal by the number of the first cyclic prefix, and the second inverse Fourier transform implements an $N_{FFT}$-point inverse Fourier transform of the physical signal on the second OFDM symbol. Specifically, the implementation methods of the first inverse Fourier transform and the second inverse Fourier transform are as follows:

The time domain continuous signal on the lth OFDM symbol on port p is:

$$s_l^{(p)}(t) = \begin{cases} \bar{s}_l^{(p)}(t) & t_{start,l} \le t < t_{start,l} + T_{symb} \\ 0 & \text{otherwise} \end{cases}$$

$$\bar{s}_l^{(p)}(t) = \begin{cases} \sum_{k=0}^{N_{FFT}-1} a_{k,l}^{(p)} e^{j2\pi(k-N_{FFT}/2)\Delta f(t-2N_{CP}T_c-t_{start,l})} & \text{when } l = \bar{l} \\ \sum_{k=0}^{N_{FFT}-1} a_{k,l}^{(p)} e^{j2\pi(k-N_{FFT}/2)\Delta f(t-N_{CP}T_c-t_{start,l})} & \text{when } l = \bar{l} + 1 \end{cases}$$

Wherein at the starting time of the time slot t=0, $N_{CP}$ represents the length of the first cyclic prefix and the second cyclic prefix, $T_c$ represents the time interval between sample points of the time domain baseband signal, $T_{symb}=(N_{FFT}+N_{CP})T_c$ represents the time length of the time domain baseband signal on one OFDM symbol, and $t_{start,l}$ represents the starting time of the lth OFDM symbol and the calculation formula thereof is:

$$t_{start,l} = \begin{cases} 0 & l = 0 \\ t_{start,l-1} + (N_{FFT} + N_{CP}) \cdot T_c & \text{otherwise} \end{cases}$$

Furthermore, according to embodiments of the disclosure, preferably, the first node device may assume that data or signal from any other device are not received on the same physical resources as those for the physical signal, so as to avoid interference between the transmitted signal and the received signal.

According to the method described in the above embodiment, except the operation of shifting is additionally needed for the first symbol of the two OFDM symbols, the signal generation method on the two OFDM symbols is the same as the conventional signal generation method, and there is no need to design a dedicated signal generation method for the two OFDM symbols except for an additional right cyclic shift.

Figure 6:
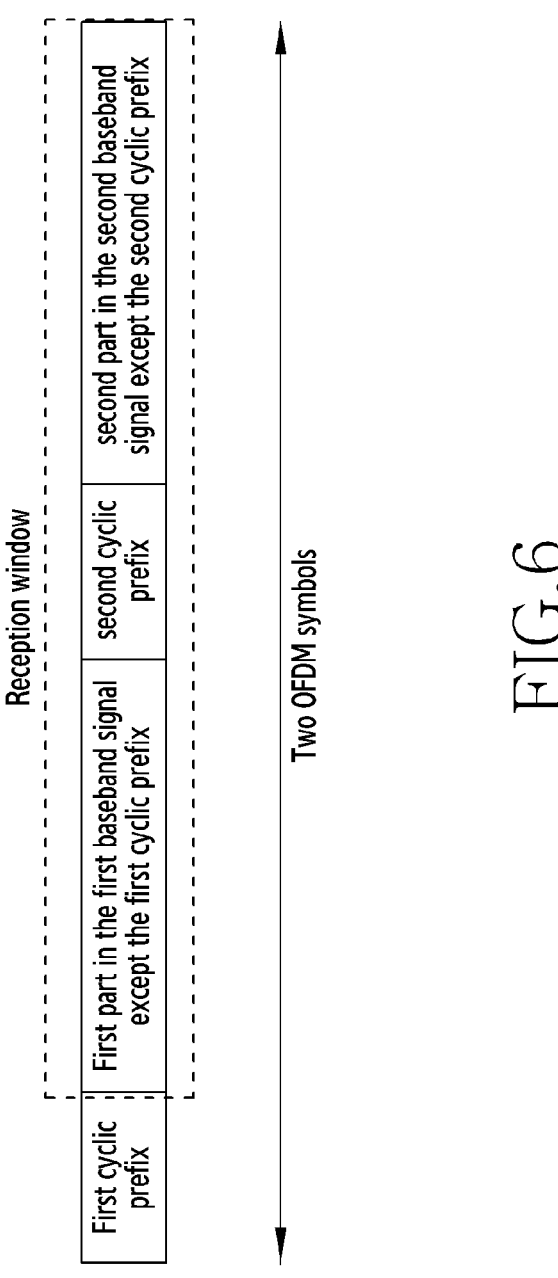
FIG. 6 illustrates an example of a position and duration of a reception window when a physical signal is mapped on two OFDM symbols in time domain according to embodiments of the present disclosure.

FIG. 6 illustrates an example of a position and duration of a reception window when a physical signal is mapped on two OFDM symbols in time domain according to embodiments of the present disclosure.

According to embodiments of the disclosure, the reception flow of the first node is as follows:

The first step: receive an echo signal.

Preferably, a receiver opens the reception window at the same time when the receiver finishes transmitting the first cyclic prefix, samples the echo signal with the same sampling rate as the transmitted signal, and closes the reception window at the same time when the receiver finishes transmitting the second part, in order to ensure that the time domain baseband signal shown in FIG. 4 can be received completely, and the position and duration of the reception window are shown in FIG. 6.

The length of the received signal in the reception window is $2N_{FFT}+N_{CP}$, wherein $N_{FFT}$ is the number of points of the Fourier transform, $N_{CP}$ is the number of points of the first cyclic prefix and the second cyclic prefix, and the signal in the reception window is denoted as y[n], with n=0, 1, . . . , $2N_{FFT}+N_{CP}-1$.

The second step: intercept and process the echo signal according to sensing distance range.

The sensing distance range may be a preset value of the device and may also be reported to the device through control information, MAC layer signaling or higher-layer signaling. The sensing distance range may have two optional values, "near" and "far," with "near" is used in the scenario where the required sensing distance range does not exceed $$\frac{c}{2\Delta f}\frac{N_{CP}}{N_{FFT}},$$

with $\Delta f$ and c represent subcarrier spacing and light speed, respectively; "far" is used in the scenario where the required sensing distance range exceeds $$\frac{c}{2\Delta f}\frac{N_{CP}}{N_{FFT}}$$

but does not exceed $$\frac{c}{2\Delta f}.$$

According to embodiments of the disclosure, if the sensing distance range is "near," data of the first $N_{FFT}$ points and data of the last $N_{FFT}$ points are extracted from y[n] and denoted as $y_1[n]$ and $y_2$ [n], respectively. Then, the $N_{FFT}$-point Fourier transform is performed on $y_1[n]$ and $y_2$ [n], respectively, and the received signal on the allocated frequency domain resources is extracted according to the resource mapping way of the physical signal, and then the channel estimation is performed. Finally, the channel estimation results are combined to obtain the sensing results.

According to embodiments of the disclosure, if the sensing distance range is "far," data of the last $N_{FFT}$ points is extracted from y[n] and denoted as $y_3[n]$. The $N_{FFT}$-point Fourier transform is performed on $y_3$ [n], and the received signal on the allocated frequency domain resources is extracted according to the resource mapping way of the physical signal, and then the channel estimation is performed to obtain the sensing result.

For implementation of the function of ultra-long-distance sensing, resource overhead of the above method according to the above embodiment of the disclosure is only one OFDM symbol, and since ultra-long-distance sensing is performed only with a long period, the overhead of this extra OFDM symbol may not significantly reduce the data transmission rate.

Figure 7:
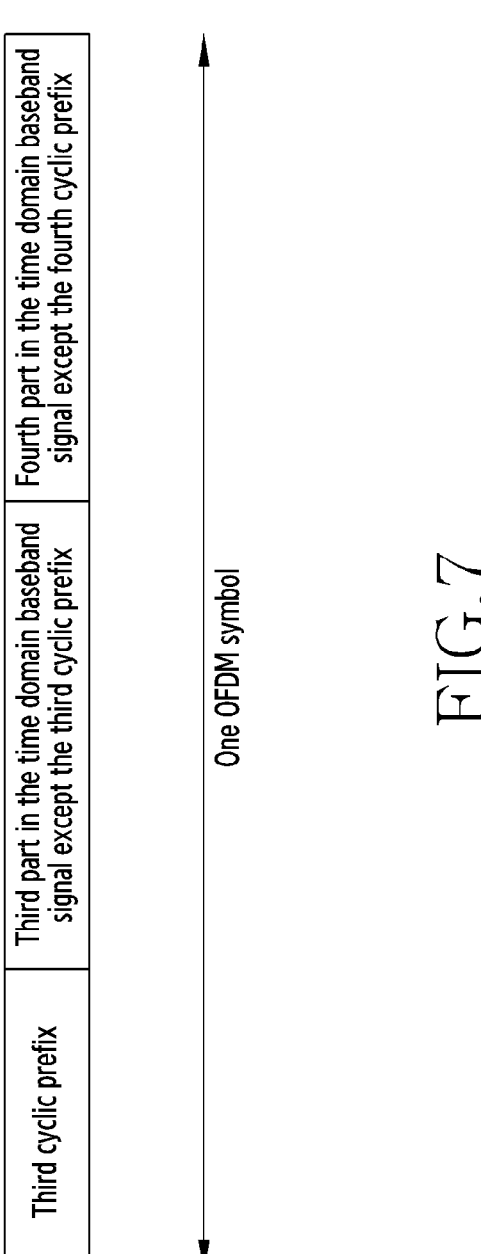
FIG. 7 illustrates an example of a structure of a time domain baseband signal generated by a physical signal when the physical signal is mapped on one OFDM symbol in time domain according to embodiments of the present disclosure.

Embodiment 2 according to the disclosure will be described below with reference to FIGS. 7-9. FIG. 7 illustrates the structure of a time domain baseband signal generated by a physical signal when the physical signal is mapped on one OFDM symbol in time domain according to embodiments of the present disclosure.

Referring to the embodiment shown in FIG. 7, the physical signal is mapped on one OFDM symbol in time domain, and the time domain baseband signal generated by the physical signal consists of a third cyclic prefix and a third part and a fourth part in the time domain baseband signal except the third cyclic prefix, wherein the third part and the fourth part are completely the same, as shown in FIG. 7.

According to the embodiment described with reference to FIG. 7, according to the nature of discrete Fourier transform, after resource mapping and then performing discrete Fourier transform on even-numbered subcarriers (numbered from 0), the obtained time domain waveform is repetitive, and the first half waveform and the last half waveform are exactly the same. In this way, although the cyclic prefix on this OFDM symbol is just a normal cyclic prefix with a short length, the time domain baseband signal of the first half in time acts as the cyclic prefix of the time domain baseband signal of the last half in time, which in turn may greatly increase the coverage of the time domain baseband signal of the last half.

Referring to FIG. 7, the physical signal according to embodiments of the disclosure and the time domain baseband signal generated by the physical signal may be generated by the following method:

Step 1: Generate the Physical Signal.

The physical signal may be a multi-port signal, and physical signals of each port are orthogonal, which can be mapped to the same subcarrier but with different cyclic shifts, wherein the physical signals are only mapped to even-numbered subcarriers when resource mapping is performed in frequency domain. Specifically, assuming that the maximum number of ports supported by the system is $N_{port}$, and the number of physical signal ports mapped to the same subcarrier but with different cyclic shifts is $N_3$, then $N_3=N_{port}$. A sequence is resource-mapped on one OFDM symbol, producing the physical signal for generating the baseband signal. With reference to FIG. 8, $N_{port}=8$ is taken as an example, the method of generating the physical signal through the sequence will be described in detail. FIG. 8 illustrates an example of frequency domain resource mapping of an 8-port physical signal when the physical signal is mapped on one OFDM symbol in time domain according to embodiments of the present disclosure.

A first node device may assume that the sequence used to generate the physical signal is defined as r(n) and that r(n) is scaled by a factor $\beta$ to satisfy the transmission power requirements, and assumes that r(n) is mapped on resource element $(k, l)_p$ according to the following way:

$$a_{k,l}^{(p)} = \beta w_f^{(p)}(k')r(8n+k')$$

$$k = 16n + 2k'$$

-continued $$k' = 0, 1, \ldots, 7$$

$$l = \bar{l}$$

$$n = 0, 1, \ldots$$

wherein $p \in \{0,1,2,3,4,5,6,7\}$ represents the number of a port, $(k, l)_p$ represents the number of a resource element defined by the kth subcarrier and the lth OFDM symbol in the resource grid of port p, the calculation formula for $$w_f^{(p)}(k') \text{ is } w_f^{(p)}(k') = e^{j\frac{p2\pi}{8}k'},$$

and $\bar{l}$ represents the number of the OFDM symbol where the baseband signal is located. The specific value of $\bar{l}$ may be a preset value, may be given by control information, and may also be given by MAC layer signaling or higher-layer signaling. And the following conditions are satisfied: (1) resource elements are in a resource block (RB) allocated to the transmission of the physical signal; (2) the reference point of k is the $0^{th}$ subcarrier of the RB with the smallest number within the system bandwidth; (3) the reference point of l is defined relative to the starting OFDM symbol of a time slot.

In one embodiment of Step 2, the time domain baseband signal by the physical signal is generated.

An inverse Fourier transform is performed on the physical signal on the OFDM symbol to obtain the baseband signal, specifically, the implementation method of the Fourier transform is as follows:

The time domain continuous signal on the lth OFDM symbol on port p is:

$$s_l^{(p)}(t) = \begin{cases} \bar{s}_l^{(p)}(t) & t_{start,l} \le t < t_{start,l} + T_{symb} \\ 0 & \text{otherwise} \end{cases}$$

$$\sum_{k=0}^{N_{FFT}-1} a_{k,l}^{(p)} e^{j2\pi(k-N_{FFT}/2)\Delta f(t-N_{CP}T_c-t_{start,l})}$$

Wherein at the starting time of the time slot t=0, $N_{CP}$ represents the length of the first cyclic prefix and the second cyclic prefix, $T_c$ represents the time interval between sample points of the time domain baseband signal, $T_{symb}=(N_{FFT}+N_{CP})T_c$ represents the time length of the time domain baseband signal on one OFDM symbol, and $t_{start,l}$ represents the starting time of the lth OFDM symbol and the calculation formula thereof is:

$$t_{start,l} = \begin{cases} 0 & l = 0 \\ t_{start,l-1} + (N_{FFT} + N_{CP}) \cdot T_c & \text{otherwise} \end{cases}$$

Furthermore, according to embodiments of the disclosure, preferably, the first node device may assume that data or signal from any other device are not received on the same physical resources as those for the physical signal, so as to avoid interference between the transmitted signal and the received signal.

Figure 9:
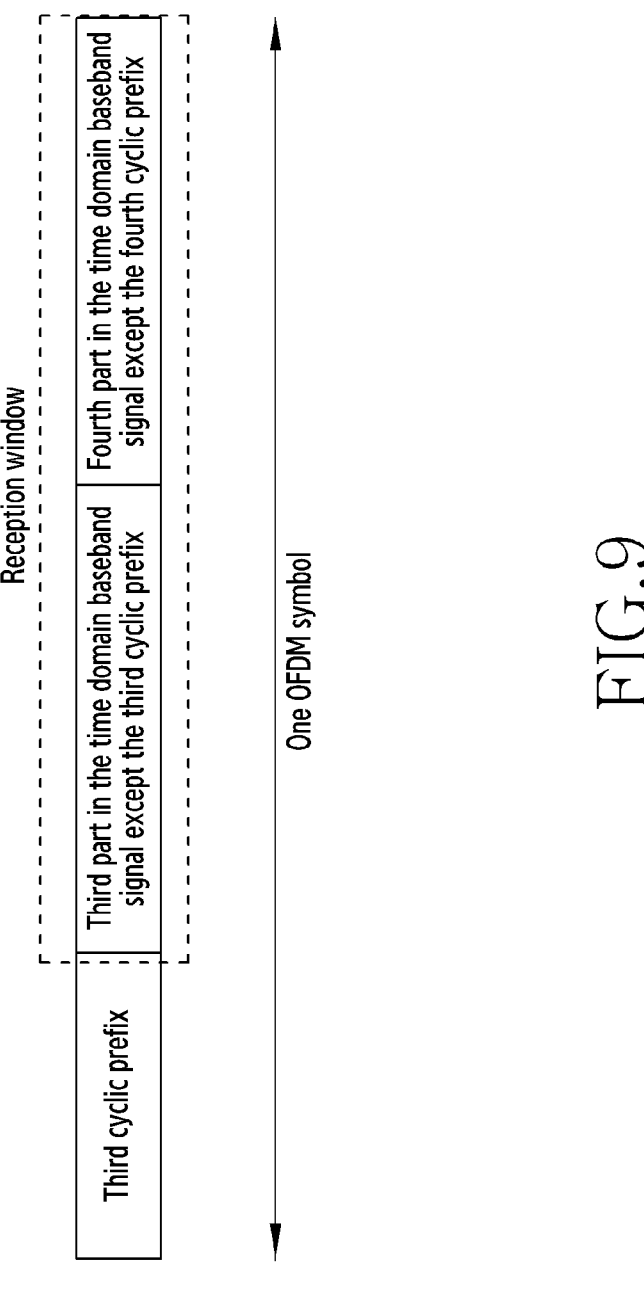
FIG. 9 illustrates an example of a position and duration of a reception window when a physical signal is mapped on one OFDM symbol in time domain according to embodiments of the present disclosure.

FIG. 9 illustrates an example of a position and duration of a reception window when a physical signal is mapped on one OFDM symbol in time domain according to embodiments of the present disclosure.

Referring to FIG. 9, according to embodiments of the disclosure, the reception flow of the first node is as follows.

The first step: receive an echo signal.

Preferably, a receiver opens the reception window at the same time when the receiver finishes transmitting the third cyclic prefix, samples the echo signal with the same sampling rate as the transmitted signal, and closes the reception window at the same time when the received finishes transmitting the fourth part, in order to ensure that the time domain baseband signal shown in FIG. 7 can be received completely, and the position and duration of the reception window are shown in FIG. 9.

The length of the received signal in the reception window is $N_{FFT}$, wherein $N_{FFT}$ is the number of points of the Fourier transform, and the signal in the reception window is denoted as y[n], with n=0, 1, . . . , $N_{FFT}-1$.

The second step: intercept and process the echo signal according to sensing distance range.

The sensing distance range may be a preset value of the device and may also be reported to the device through control information, MAC layer signaling or higher-layer signaling. The sensing distance range may have two optional values, "near" and "medium," with "near" is used in the scenario where the required sensing distance range does not exceed $$\frac{c}{2\Delta f} \frac{N_{CP}}{N_{FFT}},$$

with $\Delta f$ and c represent subcarrier spacing and light speed, respectively; "medium" is used in the scenario where the required sensing distance range exceeds $$\frac{c}{2\Delta f} \frac{N_{CP}}{N_{FFT}}$$

but does not exceed $$\frac{c}{4\Delta f}.$$

According to embodiments of the disclosure, if the sensing distance range is "near," data of the first $$\frac{N_{FFT}}{2}$$

points and data of the last $$\frac{N_{FFT}}{2}$$

points are extracted from y[n] and denoted as $y_1[n]$ and $y_2[n]$, respectively. Then, the $$\frac{N_{FFT}}{2} -$$

point Fourier transform is performed on $y_1[n]$ and $y_2[n]$, respectively, and the received signal on the allocated frequency domain resources is extracted according to the resource mapping way of the physical signal, and then the channel estimation is performed. Finally, the channel estimation results are combined to obtain the sensing results.

According to embodiments of the disclosure, if the sensing distance range is "medium," data of the last $$\frac{N_{FFT}}{2}$$

points is extracted from y[n] and denoted as $y_3$ [n]. The $$\frac{N_{FFT}}{2} -$$

point Fourier transform is performed on $y_3[n]$, and the received signal on the allocated frequency domain resources is extracted according to the resource mapping way of the physical signal, and then the channel estimation is performed to obtain the sensing result.

Figure 8:
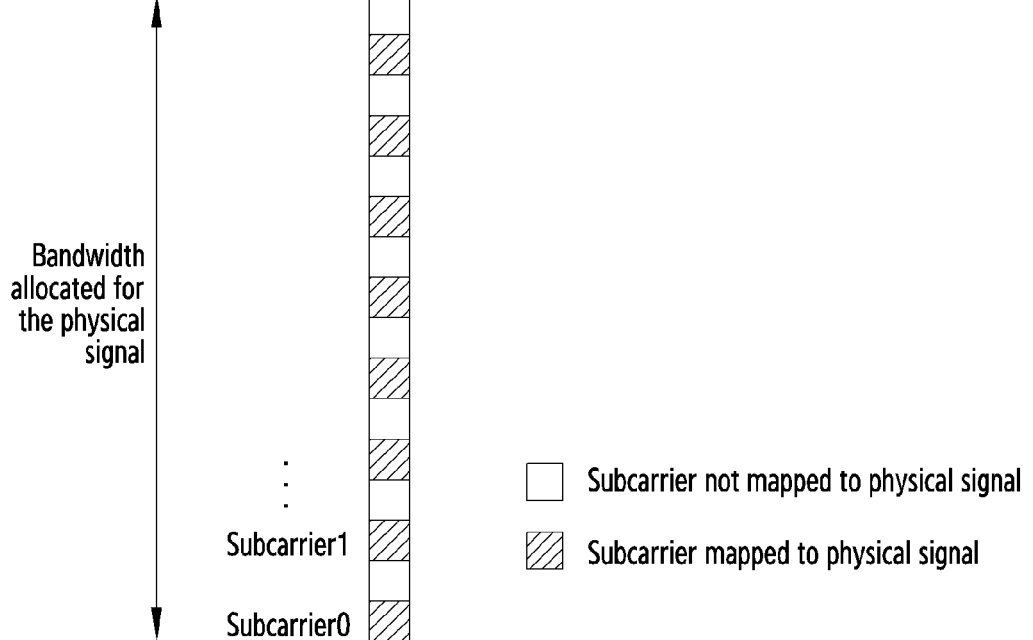
FIG. 8 illustrates an example of a frequency domain resource mapping of an 8-port physical signal when the physical signal is mapped on one OFDM symbol in time domain according to embodiments of the present disclosure.

Although Embodiment 2 described with reference to FIGS. 7-9 compared with the physical signal described with reference to FIGS. 4-6, the equivalent cyclic prefix of the second part of the time domain baseband signal for the physical signal described in the Embodiment 2 is shortened to half an OFDM waveform, that is, the sensing distance range is only half of that of the physical signal described in Embodiment 1, but only one OFDM symbol may still be used to perform sensing of ultra-communication coverage, thereby reducing the resource overhead of ultra-long distance sensing of the physical signal described in Embodiment 1.

Secondly, if the resource overhead of the physical signal in Embodiment 2 is kept the same as that of the physical signal in Embodiment 1, the period of the physical signal in Embodiment 2 may be shortened by half, and the sensing ability range of Doppler frequency offset may be doubled.

According to an embodiment of the present disclosure, a method performed by a first node in a wireless communication system, the method comprising: generating a physical signal; generating a first baseband signal on a first time unit and a second baseband signal on a second time unit based on the physical signal.

According to an embodiment of the present disclosure, wherein, the first baseband signal comprises a first cyclic prefix and a first part except the first cyclic prefix; the second baseband signal comprises a second cyclic prefix and a second part except the second cyclic prefix; the first part is the same as the second part after being cyclic shifted to the left by the number of the length of the first cyclic prefix.

According to an embodiment of the present disclosure, wherein performing a first inverse Fourier transform on the physical signal to obtain the first baseband signal; performing a second inverse Fourier transform on the physical signal to obtain the second baseband signal.

According to an embodiment of the present disclosure, any one of the above, wherein generating a physical signal comprises: mapping a sequence to time-frequency domain resources to obtain the physical signal; wherein mapping a sequence to time-frequency domain resources comprises: mapping the sequence based on different subcarriers and/or different cyclic shifts.

According to an embodiment of the present disclosure, wherein the subcarriers are determined based on an offset, and the offset is a value from 0 to the number of ports −1.

According to an embodiment of the present disclosure, any one of the above, wherein the physical signal corresponds to at least one port, and the physical signal corresponding to each of multiple ports is mapped to different subcarriers or to a same subcarrier with different cyclic shifts.

According to an embodiment of the present disclosure, a method performed by a first node in a wireless communication system, the method comprising: generating a physical signal; generating a first baseband signal on a first time unit based on the physical signal; the first baseband signal comprises a first cyclic prefix and a first part and a second part except the first cyclic prefix; and the first part and the second part are the same.

According to an embodiment of the present disclosure, wherein generating a physical signal comprises mapping a sequence to subcarriers based on different cyclic shifts to obtain the physical signal.

According to an embodiment of the present disclosure, wherein mapping a sequence to subcarriers comprises mapping the sequence to subcarriers with even numbers, wherein the numbers start from 0.

According to an embodiment of the present disclosure, any one of the above, wherein the physical signal corresponds to at least one port, and the physical signal corresponding to each of multiple ports is mapped to a same subcarrier and has different cyclic shifts.

According to an embodiment of the present disclosure, a method performed by a first node in a wireless communication system, the method comprising: receiving, within a reception window, a part of a baseband signal except a first cyclic prefix; the baseband signal comprises a first baseband signal on a first time unit and a second baseband signal on a second time unit, wherein: the first baseband signal comprises a first cyclic prefix and a first part except the first cyclic prefix; the second baseband signal comprises a second cyclic prefix and a second part except the second cyclic prefix; the first part is the same as the second part after being cyclic shifted to the left by the number of the length of the first cyclic prefix; and performing channel estimation based on the received part of the baseband signal except the first cyclic prefix.

According to an embodiment of the present disclosure, further comprising: determining a sensing result within a first distance range based on the channel estimation of the first part and the second part; or determining a sensing result within a second distance range based on the channel estimation of the second part, the second distance range is greater than the first distance range.

According to an embodiment of the present disclosure, any one of above, wherein data or signals from other devices are not received on the same time-frequency domain resources as those for the baseband signal.

According to an embodiment of the present disclosure, any one of the above, wherein the reception window is opened at the same time as the transmission of the first cyclic prefix is ended, and the reception window is closed at the same time as the transmission of the second part is ended.

According to an embodiment of the present disclosure, a method performed by a first node in a wireless communication system, the method comprising: receiving, within a reception window, a part of a baseband signal except a first cyclic prefix; the baseband signal is a first baseband signal on a first time unit, wherein: the first baseband signal comprises the first cyclic prefix and a first part and a second part except the first cyclic prefix; the first part and the second part are the same; and performing channel estimation based on the received part of the baseband signal except the first cyclic prefix.

According to an embodiment of the present disclosure, further comprising: determining a sensing result within a first distance range based on the channel estimation of the first part and the second part; or determining a sensing result within a second distance range based on the channel estimation of the second part, wherein the second distance range is greater than the first distance range.

According to an embodiment of the present disclosure, any one of the above, wherein data or signals from other devices are not received on the same time-frequency domain resources as those for the baseband signal.

According to an embodiment of the present disclosure, any one of above, wherein the reception window is opened at the same time as the transmission of the first cyclic prefix is ended, and the reception window is closed at the same time as the transmission of the second part is ended.

According to an embodiment of the present disclosure, a first node in a wireless communication network, the first node comprising: a transceiver configured to transmit and receive a signal with outside; and a controller configured to control the transceiver to perform the methods of above.

Figure 10:
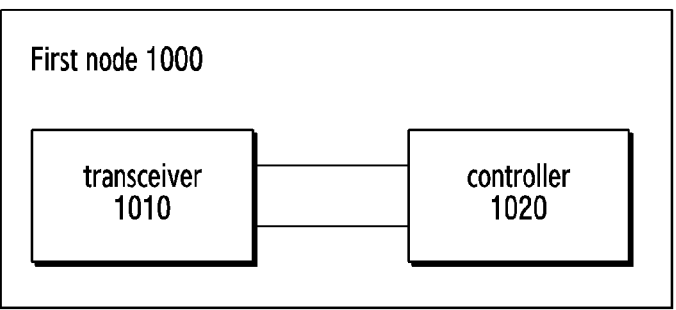
FIG. 10 illustrates an example of a block diagram of the structure of a first node for transmitting and receiving a physical signal according to embodiments of the present disclosure.

FIG. 10 illustrates an example of a structure of a first node for transmitting and receiving a physical signal according to embodiments of the present disclosure.

Referring to FIG. 10, the first node 1000 includes a transceiver 1010 and a controller 1020. The transceiver 1010 is configured to transmit a signal to the outside and receive a signal from the outside. The controller 1020 is configured to control the transceiver to transmit/receive a physical signal and perform all the methods described in the disclosure. The first node 1000 may be implemented in the form of hardware, software, or a combination of hardware and software to be enabled to perform all the methods described in the disclosure, and may include, but is not limited to, a UE, a BS, a relay node, an integrated access backhaul (IAB), etc.

Figure 11:
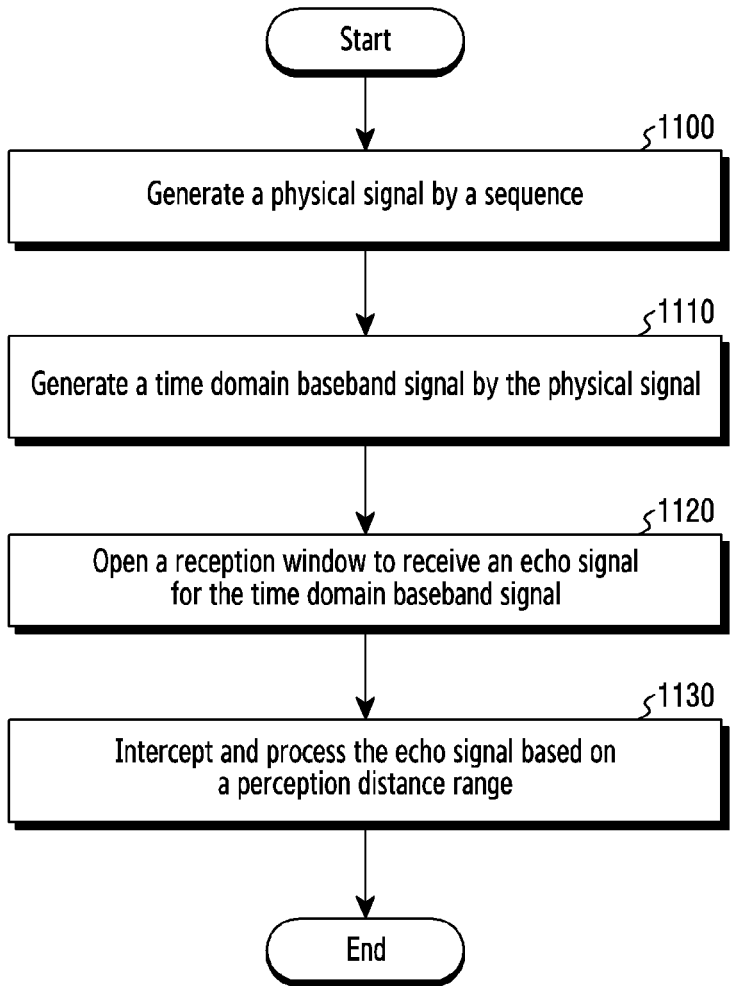
FIG. 11 illustrates a flowchart of a sensing operation based on a physical signal according to embodiments of the present disclosure.

FIG. 11 illustrates a flowchart of sensing based on a physical signal according to embodiments of the present disclosure.

According to embodiments of the disclosure, at 1110, the physical signal is generated by a sequence; at 1120, a time domain baseband signal is generated by the physical signal; at 1130, a reception window is opened to receive an echo signal for the time domain baseband signal; at 1140, the echo signal is intercepted and processed according to a sensing distance range.

The present disclosure aims to design a method for generating and transmitting a physical signal, which may achieve an ultra-long equivalent cyclic prefix under the condition of a frame structure design with a normal cyclic prefix, and may further perform sensing of an ultra-cell coverage.

Figure 12:
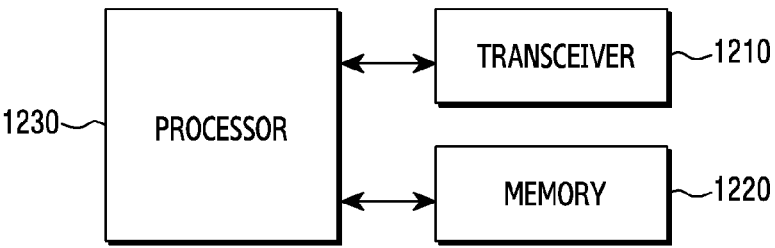
FIG. 12 illustrates an example of a structure of a UE according to an embodiment of the present disclosure.

FIG. 12 illustrates an example of a structure of a UE according to an embodiment of the present disclosure.

As shown in FIG. 12, the UE according to an embodiment may include a transceiver 1210, a memory 1220, and a processor 1230. The transceiver 1210, the memory 1220, and the processor 1230 of the UE may operate according to a communication method of the UE described above. However, the components of the UE are not limited thereto. For example, the UE may include more or fewer components than those described above. In addition, the processor 1230, the transceiver 1210, and the memory 1220 may be implemented as a single chip. Also, the processor 1230 may include at least one processor. Furthermore, the UE of FIG. 12 corresponds to the UE 111, 112, 113, 114, 115, 116 of the FIG. 1, respectively.

The transceiver 1210 collectively refers to a UE receiver and a UE transmitter and may transmit/receive a signal to/from a base station or a network entity. The signal transmitted or received to or from the base station or a network entity may include control information and data. The transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the UE. Also, the memory 1220 may store control information or data included in a signal obtained by the UE. The memory 1220 may be a storage medium, such as read-only memory (ROM), random access memory (RAM), a hard disk, a CD-ROM, and a DVD, or a combination of storage media.

The processor 1230 may control a series of processes such that the UE operates as described above. For example, the transceiver 1210 may receive a data signal including a control signal transmitted by the base station or the network entity, and the processor 1230 may determine a result of receiving the control signal and the data signal transmitted by the base station or the network entity.

Figure 13:
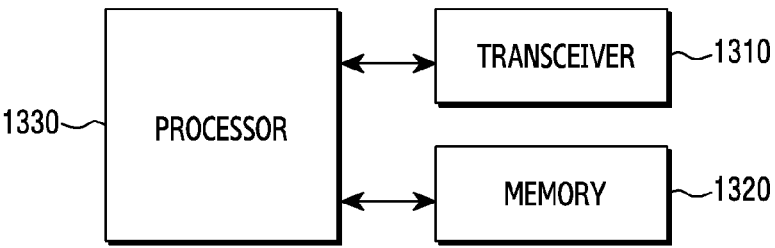
FIG. 13 illustrates an example of a structure of a base station according to an embodiment of the present disclosure.

FIG. 13 illustrates an example of a structure of a base station according to an embodiment of the present disclosure.

As shown in FIG. 13, the base station according to an embodiment may include a transceiver 1310, a memory 1320, and a processor 1330. The transceiver 1310, the memory 1320, and the processor 1330 of the base station may operate according to a communication method of the base station described above. However, the components of the base station are not limited thereto. For example, the base station may include more or fewer components than those described above. In addition, the processor 1330, the transceiver 1310, and the memory 1320 may be implemented as a single chip. Also, the processor 1330 may include at least one processor. Furthermore, the base station of FIG. 13 corresponds to base station (e.g., BS 101, 102, 103 of FIG. 1).

The transceiver 1310 collectively refers to a base station receiver and a base station transmitter and may transmit/receive a signal to/from a terminal (UE) or a network entity. The signal transmitted or received to or from the terminal or a network entity may include control information and data. The transceiver 1310 may include a RF transmitter for up-converting and amplifying a frequency of a transmitted signal, and a RF receiver for amplifying low-noise and down-converting a frequency of a received signal. However, this is only an example of the transceiver 1310 and components of the transceiver 1310 are not limited to the RF transmitter and the RF receiver.

Also, the transceiver 1310 may receive and output, to the processor 1330, a signal through a wireless channel, and transmit a signal output from the processor 1330 through the wireless channel.

The memory 1320 may store a program and data required for operations of the base station. Also, the memory 1320 may store control information or data included in a signal obtained by the base station. The memory 1320 may be a storage medium, such as read-only memory (ROM), random access memory (RAM), a hard disk, a CD-ROM, and a DVD, or a combination of storage media.

The processor 1330 may control a series of processes such that the base station operates as described above. For example, the transceiver 1310 may receive a data signal including a control signal transmitted by the terminal, and the processor 1330 may determine a result of receiving the control signal and the data signal transmitted by the terminal.

Various embodiments of the disclosure can be implemented as computer-readable codes embodied on a computer-readable recording medium from a specific perspective. A computer-readable recording medium is any data storage device that can store data readable by a computer system. Examples of computer-readable recording media may include read-only memory (ROM), random access memory (RAM), compact disk read-only memory (CD-ROM), magnetic tape, floppy disk, optical data storage device, carrier wave (for example, data transmission via the Internet), and the like. Computer-readable recording media can be distributed through computer systems connected via a network, and thus computer-readable codes can be stored and executed in a distributed manner. Moreover, functional programs, codes and code segments for implementing various embodiments of the disclosure can be easily interpreted by those skilled in the art to which the embodiments of the disclosure are applied.

It will be understood that embodiments of the disclosure can be implemented in the form of hardware, software, or a combination of hardware and software. Software can be stored as program instructions or computer-readable code executable on a processor on a non-transitory computer-readable medium. Examples of non-transient computer-readable recording media include magnetic storage media (e.g., ROM, floppy disk, hard disk, etc.) and optical recording media (e.g., CD-ROM, digital video disk (DVD), etc.). Non-transient computer-readable recording media can also be distributed on network-coupled computer systems, so that computer-readable codes are stored and executed in a distributed manner. The medium can be read by a computer, stored in a memory, and executed by a processor. Various embodiments may be implemented by a computer or a portable terminal including a controller and a memory, and the memory may be an example of a non-transitory computer-readable recording medium suitable for storing program (s) having instructions for implementing embodiments of the disclosure. The disclosure can be implemented by a program having codes for concretely implementing the apparatus and method described in the claims, which is stored in a machine (or computer) readable storage medium. The program may be electronically carried on any medium, such as a communication signal transmitted via a wired or wireless connection, and this disclosure suitably includes its equivalents.

What has been described above is only the specific implementation of this disclosure, but the protection scope of this disclosure is not limited to this. Those skilled in the art can make various changes or substitutions within the technical scope disclosed in this disclosure, and these changes or substitutions should be included in the protection scope of this disclosure. Therefore, the scope of protection of this disclosure should be based on the protection scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first node in a wireless communication system, the method comprising:

generating a first physical signal and a second physical signal; and generating a first baseband signal on a first time unit based on the first physical signal and a second baseband signal on a second time unit based on the second physical signal, wherein the first baseband signal comprises a first part in which the first physical signal is leftward cyclic shifted by a length of a first cyclic prefix and the first cyclic prefix which is appended to a head of the first part, wherein the second baseband signal comprises a second part and a second cyclic prefix which is appended to a head of the second part, and wherein a third part comprising a part of the first part of the first baseband signal and the second cyclic prefix of the second baseband signal is configured as a cyclic prefix for the second part of the second baseband signal which is used for joint communication and sensing (JCAS).

2. The method of claim 1, wherein the third part and the second part of the second baseband signal are identical to each other.

3. The method of claim 2, further comprising:

performing a first inverse Fourier transform on the first physical signal to obtain the first baseband signal; and performing a second inverse Fourier transform on the second physical signal to obtain the second baseband signal.

4. The method of claim 1, wherein generating the first physical signal and the second physical signal further comprises mapping a first sequence and a second sequence to time-frequency domain resources to obtain the first physical signal and the second physical signal, respectively; and wherein mapping the first sequence and the second sequence to time-frequency domain resources comprises mapping the first sequence and the second sequence based on at least one of different subcarriers or different cyclic shifts.

5. The method of claim 4, wherein each of subcarriers is determined based on an offset including a range of value between zero and a number of ports −1.

6. The method of claim 1, wherein each of the first physical signal and the second physical signal corresponds to at least one port and is mapped to different subcarriers or to a same subcarrier with different cyclic shifts.

7. The method of claim 1, wherein each of the first time unit and the second time unit is one orthogonal frequency division multiplexing (OFDM) symbol, respectively.

8. The method of claim 7, wherein the first time unit and the second time unit is contiguous in a time domain.

9. A first node in a wireless communication system, the first node comprising:

a transceiver; and a controller coupled with the transceiver and configured to:

generate a first physical signal and a second physical signal, and generate a first baseband signal on a first time unit based on the first physical signal and a second baseband signal on a second time unit based on the second physical signal, wherein the first baseband signal comprises a first part in which the first physical signal is leftward cyclic shifted by a length of a first cyclic prefix and the first cyclic prefix which is appended to a head of the first part, wherein the second baseband signal comprises a second part and a second cyclic prefix which is appended to a head of the second part, and wherein a third part comprising a part of the first part of the first baseband signal and the second cyclic prefix of the second baseband signal is configured as a cyclic prefix for the second part of the second baseband signal which is used for joint communication and sensing (JCAS).

10. The first node of claim 9, wherein the third part and the second part of the second baseband signal are identical to each other.

11. The first node of claim 10, the controller is further configured to:

perform a first inverse Fourier transform on the first physical signal to obtain the first baseband signal; and perform a second inverse Fourier transform on the second physical signal to obtain the second baseband signal.

12. The first node of claim 9, wherein, for generating the first physical signal and the second physical signal, the controller is further configured to:

map a first sequence and a second sequence to time-frequency domain resources to obtain the first physical signal and the second physical signal, respectively; and for mapping the first sequence and the second sequence to time-frequency domain resources, map the first sequence and the second sequence based on at least one of different subcarriers or different cyclic shifts.

13. The first node of claim 12, wherein each of subcarriers is determined based on an offset including a range of value between zero and a number of ports −1.

14. The first node of claim 9, wherein each of the first physical signal and the second physical signal corresponds to at least one port and is mapped to different subcarriers or to a same subcarrier with different cyclic shifts.

15. The first node of claim 9, wherein each of the first time unit and the second time unit is one orthogonal frequency division multiplexing (OFDM) symbol.

16. The first node of claim 15, wherein the first time unit and the second time unit is contiguous in a time domain.

* * * * *